United States Patent
Fleet et al.

(10) Patent No.: US 9,292,830 B2
(45) Date of Patent: Mar. 22, 2016

(54) METHOD AND APPARATUS FOR SOCIAL MEDIA ADVISOR FOR RETENTION AND TREATMENT (SMART)

(71) Applicant: CGI TECHNOLOGIES AND SOLUTIONS INC., Fairfax, VA (US)

(72) Inventors: Charles O'Bryan Fleet, Littleton, CO (US); Paul Gallucci, Oakville, CA (US)

(73) Assignee: CGI TECHNOLOGIES AND SOLUTIONS INC., Fairfax, VA (US)

( * ) Notice: Subject to any disclaimer, the term of this patent is extended or adjusted under 35 U.S.C. 154(b) by 0 days.

(21) Appl. No.: 13/667,857

(22) Filed: Nov. 2, 2012

(65) Prior Publication Data

US 2013/0117281 A1    May 9, 2013

Related U.S. Application Data

(60) Provisional application No. 61/555,169, filed on Nov. 3, 2011.

(51) Int. Cl.
| | | |
|---|---|---|
| *G06Q 10/10* | (2012.01) | |
| *G06Q 30/02* | (2012.01) | |
| *G06Q 50/00* | (2012.01) | |

(52) U.S. Cl.
CPC .............. *G06Q 10/10* (2013.01); *G06Q 30/02* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,668,957 B2 | 2/2010 | Achlioptas et al. | |
| 7,734,610 B2 | 6/2010 | Rakowski et al. | |
| 7,805,492 B1 | 9/2010 | Thatcher et al. | |
| 7,853,614 B2 | 12/2010 | Hoffman et al. | |
| 7,930,430 B2 | 4/2011 | Thatcher et al. | |
| 7,933,856 B2 | 4/2011 | Verspoor et al. | |
| 7,941,329 B2 | 5/2011 | Kenedy et al. | |
| 7,966,316 B2 | 6/2011 | Cao et al. | |
| 7,966,647 B1 | 6/2011 | Igoe et al. | |
| 7,970,827 B1 | 6/2011 | Cumberbatch et al. | |
| 7,970,934 B1 | 6/2011 | Patel | |
| 8,005,720 B2 | 8/2011 | King et al. | |
| 2006/0143183 A1 | 6/2006 | Goldberg et al. | |
| 2008/0126344 A1 | 5/2008 | Hoffman et al. | |
| 2008/0133402 A1 | 6/2008 | Kurian et al. | |
| 2008/0184349 A1* | 7/2008 | Ting | 726/7 |
| 2008/0234787 A1 | 9/2008 | Kaphan et al. | |
| 2009/0029674 A1 | 1/2009 | Brezina et al. | |
| 2009/0031244 A1 | 1/2009 | Brezina et al. | |

(Continued)

*Primary Examiner* — Alex Gofman
*Assistant Examiner* — Umar Mian
(74) *Attorney, Agent, or Firm* — McDermott Will & Emery LLP

(57) ABSTRACT

A method and apparatus are implemented in one or more processors for processing various social media data received over a network for collection, analysis, and application to business logic and/or business applications. Based on personally identifying information of an account holder, social media data regarding the account holder is retrieved from one or more social media sources or a clearing house over the network. The retrieved social media data is processed (i.e., parsed and/or filtered, and validated) via certain criteria. A usefulness score for the social media data is computed based on various factors including at least one of an identity match value, a truth confidence value, and a context data relevance value. The social media data and its computed usefulness score can be presented to a user and business applications for further processing and treatment of the account holder.

23 Claims, 7 Drawing Sheets

(56) References Cited

U.S. PATENT DOCUMENTS

| | | |
|---|---|---|
| 2009/0106676 A1 | 4/2009 | Brezina et al. |
| 2009/0112685 A1 | 4/2009 | Tunguz-Zawislak et al. |
| 2009/0177754 A1 | 7/2009 | Brezina et al. |
| 2009/0265639 A1 | 10/2009 | Shuster |
| 2010/0088313 A1 | 4/2010 | Hoffman et al. |
| 2010/0119053 A1* | 5/2010 | Goeldi ............... 379/265.09 |
| 2010/0153287 A1 | 6/2010 | Holzberg |
| 2010/0235219 A1 | 9/2010 | Merrick et al. |
| 2010/0306185 A1 | 12/2010 | Smith et al. |
| 2010/0332482 A1 | 12/2010 | Melton |
| 2011/0010384 A1 | 1/2011 | Luo et al. |
| 2011/0010423 A1 | 1/2011 | Thatcher et al. |
| 2011/0029620 A1 | 2/2011 | Bonforte |
| 2011/0035250 A1 | 2/2011 | Finucan |
| 2011/0035451 A1 | 2/2011 | Smith et al. |
| 2011/0046980 A1 | 2/2011 | Metzler et al. |
| 2011/0046981 A1 | 2/2011 | Metzler et al. |
| 2011/0047404 A1 | 2/2011 | Metzler et al. |
| 2011/0047508 A1 | 2/2011 | Metzler et al. |
| 2011/0082849 A1 | 4/2011 | Rakowski et al. |
| 2011/0087969 A1 | 4/2011 | Hein et al. |
| 2011/0119593 A1 | 5/2011 | Jacobson et al. |
| 2011/0125550 A1* | 5/2011 | Erhart et al. ............... 705/7.29 |
| 2011/0131122 A1 | 6/2011 | Griffin et al. |
| 2011/0131123 A1 | 6/2011 | Griffin et al. |
| 2011/0131130 A1 | 6/2011 | Griffin et al. |
| 2011/0131131 A1 | 6/2011 | Griffin et al. |
| 2011/0137975 A1 | 6/2011 | Das et al. |
| 2011/0145192 A1 | 6/2011 | Quintela et al. |
| 2011/0150335 A1 | 6/2011 | King et al. |
| 2011/0161155 A1 | 6/2011 | Wilhelm et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0191768 A1 | 8/2011 | Smith |
| 2012/0047219 A1* | 2/2012 | Feng et al. ............... 709/207 |
| 2012/0166432 A1* | 6/2012 | Tseng ............... 707/728 |
| 2012/0226701 A1* | 9/2012 | Singh ............... 707/748 |
| 2013/0080428 A1* | 3/2013 | Wang et al. ............... 707/732 |
| 2013/0124497 A1* | 5/2013 | Lin et al. ............... 707/709 |

* cited by examiner

METHOD AND APPARATUS FOR SOCIAL MEDIA ADVISOR FOR RETENTION AND TREATMENT (SMART)

RELATED APPLICATIONS AND CLAIM OF PRIORITY

This application claims the benefit of priority to U.S. Provisional Application Ser. No. 61/555,169, entitled "Social Media Advisor for Retention and Treatment" filed by Paul Galucci et al. on Nov. 3, 2011, the entire contents of which are hereby incorporated by reference as if originally set forth herein, under 35 U.S.C. §119(e).

BACKGROUND

In recent years, social media services and their uses have expanded and increased in popularity, around the world. Many people access various social media services over a network and post numerous types of information over the Internet using the social media services. A social media service is defined herein to mean any social media source such as Facebook, LinkedIn, Google+, YouTube, LinkedIn, or the like. Nowadays, it is common practices for many people to post their personal information, employment history, current employment information, interests, etc. at one or more social media sources (i.e., LinkedIn, Facebook, etc.) so that other people can access and view. As an increasing number of people around the world daily access and use the one or more social media services over a network, the number of data types and amount of available data and information to be mined over the network increase daily.

To obtain various data, including data available at one or more social media sources, over the network, there are many data gathering (or aggregation) tools by third party, such as Whitepages, Intellius, etc. or aggregation tools by social media service providers, such as Facebook, Google+, etc. The data aggregation tools are configured to go out and collect various data over the network about people and make the collected data available in raw format. However, the data aggregation tools do not include sophisticated processing rules and do not apply various business logics to the collected data for processing and future use. Hence, there is a need for techniques or methodologies that can be used in retrieving certain data relating to a person of interest, the data available from one or more social media sources ("social media data") over a network, and processing the retrieved social media data into useful business information for various applications of the retrieved social media data to business applications for better business results and customer satisfaction.

SUMMARY

The teachings or disclosed techniques herein enable transforming raw social media data retrieved from the one or more social media sources over the network into useful business information that can be used in various business situations, thereby resulting in better business results and customer satisfaction. One exemplary embodiment of the disclosed techniques can be implemented in one or more processors as the social media advisor for retention and treatment (SMART) system. First, identifying information of a person including name of an account holder is received. An account holder is defined as a person who is a known associate of a business account. For example, an account holder could be the designated owner of the account, or a co-signer of an account. A request for information regarding the account holder that is available at one or more social media sources is generated, the information is to be retrieved from the one or more social media sources over a network. In response to the request, social media data is retrieved from the one or more social media sources over the network. The retrieved social media data is processed (i.e., parsed, filtered, and/or validated) using certain criteria. The processed social media data is scored, i.e., a usefulness score is computed for the processed social media data. The computed usefulness score is associated with the processed social media data for use and analysis purposes. The computed usefulness score can be also presented to a user or one or more business applications for appropriate treatment of the account holder.

An exemplary system for using social media data in connection with one or more business applications can be implemented. The exemplary system is implemented in one or more processors, and includes a presentation component and an application component. The presentation component is configured to present various information to a user of the system or to the one or more business applications. The application component includes a filtering module, a validation module, and a usefulness score module. The filtering module is configured to receive social media data relating to a customer retrieved from one or more social media sources. The filtering module is further configured to filter the received social media data based on one or more filters. The validation module is configured to validate the filtered social media data against storied data. The usefulness score module is configured to compute a social media usefulness score (SMUS) for the validated social media.

Further, the disclosed techniques or methodologies can be embodied in an article of manufacture comprising a non-transitory computer readable storage medium and programming embodied in the medium. Execution of the programming by a processor of a computer implemented social media advisor for retention and treatment (SMART) functions. The SMART functions include functions to receive identifying information of an account holder and generate a request for information regarding the account holder, the information to be retrieved from one or more social media sources over a network. The request includes the identifying information of the account holder. The SMART functions include functions to, responsive to the request, receive social media data retrieved from at least one of: the one or more social media sources or a clearing house over the network, process the received social media data, and to compute a SMUS or usefulness score for the processed social media data based in part on a source or context of the social media data.

As a result, the disclosed techniques or methodologies provide one or more business applications or a user of SMART with updated information relating to the customer (or account holder) based on retrieved social media data in such a way that the user of SMART or a user of the one or more business applications can use the updated information about the customer to improve business results and eventually increase customer satisfaction.

Other concepts relate to unique software for implementing the disclosed techniques and methodologies. A software product, in accord with this concept, includes at least one machine-readable medium and information carried by the medium. The information carried by the medium may be executable program code, one or more databases and/or information regarding various aspects of the disclosed methodologies.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The Social Media Advisor for Retention and Treatment (SMART) service uses customer demographic and personally identifying information to access, retrieve, parse, filter, validate, score and present a dashboard of relevant business information obtained from various social media sources to default management agents or users. The personally identifying information includes customer name, e-mail, phone number, social security number, etc, or the like. The SMART service can be provided through various implementations including as a software application or hardware application configured to provide various functionalities in support of the SMART service.

Figure 1:
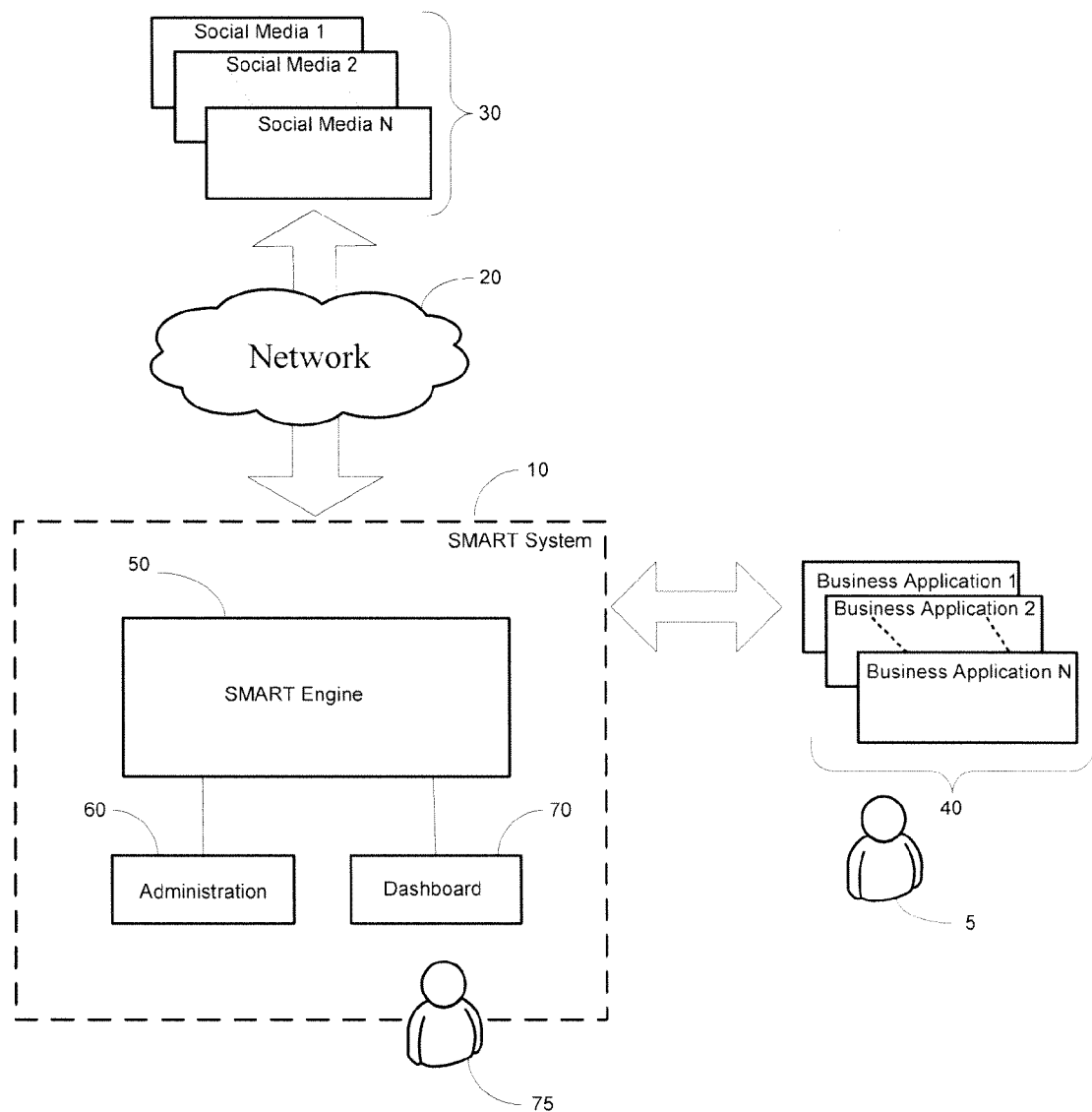
FIG. 1 is a high level, conceptual diagram showing an exemplary embodiment of the disclosed techniques.

Reference now is made in detail to the examples illustrated in the accompanying drawings and discussed below. FIG. 1 illustrates a high level, conceptual diagram showing an embodiment of the disclosed techniques and methodologies herein.

For illustration purposes, let us assume that a SMART service is used in context of collections such as auto loan or debt collection, as described below. It is assumed that a collection specialist (or a user) accesses one of accounts which is a candidate for collection of overdue payments. First, at a high level, as shown in FIG. 1, using a debt collection 40 (i.e., one of business applications), the collection specialist 5 accesses and reviews account information relating to the account, including name and contact information of the account holder. The collection specialist 5 then triggers a request for updates relating to the account holder to a SMART system 10. Conceptually, the SMART system 10 receives via the request personally identifying information relating to the account holder (or customer) from the debt collection 40 and retrieves, based on the personally identifying information, from a number of social media sources on the Internet, such as Facebook, LinkedIn, Google+, Twitter, etc.

Although herein the debt collection is used as an exemplary application (i.e., one of the business applications 40), the SMART system 10 can be used in other business processes whether that be debt collections, recovery, loss mitigation, repossession, fraud evaluation, skip tracing, foreclosure, property management or the like. Also, in another implementation, the request from the business application 40 to the SMART system 10 can be made using a batch file processing; that is, a file containing a list of account holders of interest can be provided by the business applications 40 to the SMART system 10. As noted, the one or more business applications 40 include various business applications related to debt collection, recovery, loss mitigation, repossession, fraud evaluation, skip tracing, foreclosure, property management, or the like.

In response to the request for information relating to the account holder of interest from one or more social media sources 30 over a network 20, information (or data) relating to the account holder of interest is obtained and processed by the SMART system 10. The data or information obtained or retrieved in such a manner ("social media data") from one or more social media sources can be used by the collection specialist 5 in talking with the customer or scripting could be built and/or revised based on such data or information. Alternatively, the social media data can be obtained from one of the social media data aggregation service or clearing house, which is provided by third party. The term "clearing house" is used herein to mean any commercially available social media data aggregation and/or analysis service or tool which collects various types of social media data from different social networking sites or social media sources.

The plurality of social media 30 can include social media sources, such as LinkedIn, Facebook, Google+, Twitter, or the like. Generally, a social media source can be defined as any interactive platform via which people and communities create and share user-generated content over Internet. A social media source can take on various forms such as an Internet forum, weblog, social blog, social network, etc. that is available over the network 20. The network 20 is one or more networks interconnecting with each other for communications and include private and public networks (including Internet).

The retrieved social media data can trigger decision making and new client treatment paths in its respective business application. For example, based on the retrieved social media data, it may be determined that the customer recently changed his or her job, or had a medical issue, or changed addresses, or made a large purchase. All of these new or additional information (or events) could impact the customer treatment by the collection specialist 5 or others.

Further, in the example, the social media data to be mined, the business rules, and social media sources are configurable in the SMART system 10 and can be updated or expanded from time to time. The term "social media data" to be mined herein means any data relating to an account holder to be retrieved from one or more social media sources or from one or more clearinghouses.

Exemplary types of data (social media data) that can be mined from various social media sources are employment information (i.e., employer, location, role, etc.), marital status, bankruptcy data, probate information (i.e., deceased customers and estate information), asset data (i.e., major expenditures or asset locations), commercial data (i.e., company structures, company status, new contracts, etc.), location (i.e., information on the current or historical location of the customer), time information (i.e., any raw information or patterns abut the time the customer is in a specific location, posting information active on certain demographic channels), associates information (i.e., any information about other persons, companies, organizations or entities with whom the customer interacts), interests (i.e., any information about the customer's interest in general topics, products, markets, etc.), and other details. The other details can include any other information about the customer; for example, if the customer is a Smartphone user, that can be known or inferred from various social media sources. If the customer recommends an Apple App on one social media channel (i.e., on Twitter), then it can be inferred that the customer is more likely an Apple user.

In the exemplary embodiment, the SMART system 10 contains various business rules to identify, summarize, and present only data that is relevant to the business (e.g., collections and recovery process).

Referring back to FIG. 1, the exemplary SMART system 10 interacts with a plurality of business applications 40 and a plurality of social media sources 30 via a network 20. The SMART system 10 includes a SMART engine 50 communicating with an administrative console 60 and a dashboard 70. The SMART engine 50 is a core component of the SMART system 10 and is configured to receive one or more requests from the plurality of business applications 40 for information relating to an account of interest, which the information is to be retrieved from the plurality of social media sources 30. In the exemplary embodiment, the mode of operation for the SMART system 10 can be in real-time or in batch mode. In the real-time mode, the SMART system 10 receives one or more requests for information relating to one or more accounts (or account holders) of interest inputted by a user or collection specialist via the dashboard 70 or the like. In the batch mode, the SMART system 10 receives one or more requests for information relating to one or more accounts (or account holders) of interest inputted by one or more files containing personally identifying information of the one or more account holders of interest. It is also noted that in other implementations, groups of accounts or groups of customers (account holders), i.e., via a customer file and/or an account file) can be inputted to the SMART system 10. The customer file contains customer or account information holder information from one or more business enterprise systems. The account file contains account information associated with an account holder from the one or more business enterprise systems.

The SMART engine 50 receives the information relating to the account from the plurality of social media sources 30 over the network 20 and processes the received information or social media data ("SMART processing"). In the example, the SMART processing includes various types of parsing, filtering, validating and scoring steps of the retrieved social media data (i.e., calculating a "usefulness score" for a piece of social media data) using one or more business logics. Although illustrated in detail below, in short, the usefulness score for social media data is a numerical representation of a level of usefulness if a piece of information contained in social media data. The processed social media data and its usefulness score are then made available for presentation to the one or more business applications 40 that requested for the social media data. Alternatively, the processed social media data and its usefulness score can be presented to the dashboard 70 for presentation to a user of the SMART system 10. Further, the SMART engine 50 can house various other business logics and end user configurable system administration data including configuration/operational parameters, in addition to access, retrieval, parsing/filtering, validation, scoring and presentation of the retrieved data from the various social media sources. In the exemplary embodiment, the SMART engine 50 is implemented as a software application, but it can be implemented as a hardware solution or a combination of software and hardware. Alternatively, the SMART engine 50 can be implemented as a distributed solution in two or more computers over a network in a distributed computing environment or can be implemented as a server application in a client-server environment.

In the exemplary embodiment, the dashboard 70 of the SMART system 10 is implemented as a presentation layer for viewing by a user 75 of the SMART system 10 via a graphical user interface displayed on a display device of a server implementing the SMART engine 50. Alternatively, the dashboard 70 can also be implemented as a graphical user interface displayed on a separate terminal device. Alternatively, the dashboard 70 can be implemented as part of a distributed computing application or a client application running on a device in a client-server environment. The dashboard 70 is configured to present to the user 75 various information relating to the account holder of interest, including the social media data retrieved from the social media sources, usefulness scores associated with each piece of social media data, and/or other information.

Furthermore, the dashboard 70 can be presented to the collection specialist 5 as a graphic user interface running on a terminal device on which the collection specialist 5 is operating. In this example, the collection specialist 5 can view the retrieved social media data and use information contained in the retrieved social media data to talk with the customer (or account holder of interest) about arrears. Further, in other implementations, while talking with the customer, additional information can be collected from the customer on the phone and fed back to the SMART system 10. For example, the collection specialist 5 can obtain additional information relating to the retrieved social media data from the customer on the phone and validate the retrieved social media data (i.e., whether a specific piece of information posted at a social media source is accurate or not) and provide additional input (such as discard, inaccurate info, not true, etc.) regarding the retrieved social media data to the SMART system 10 for subsequent re-evaluation of the retrieved social media data and its associated usefulness score.

Figure 3A:
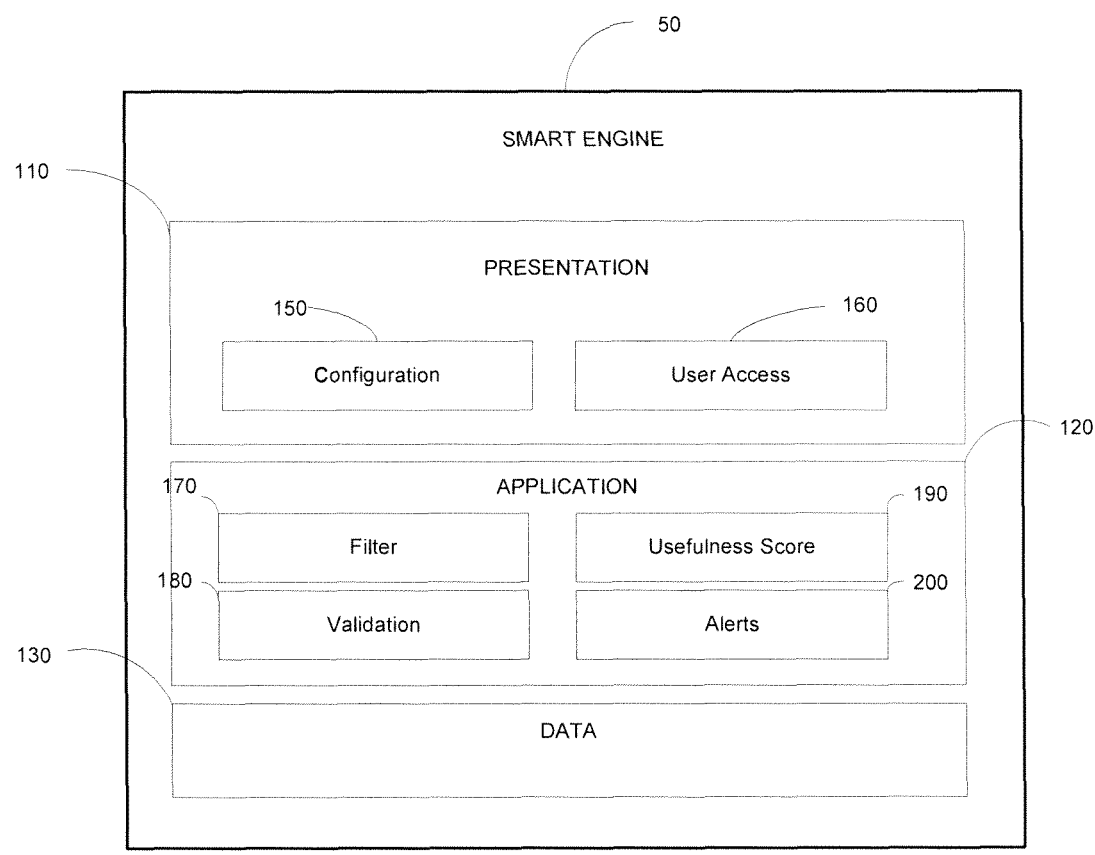
FIG. 3A is a conceptual software architecture of the exemplary SMART engine shown in FIG. 1.
Figure 3B:
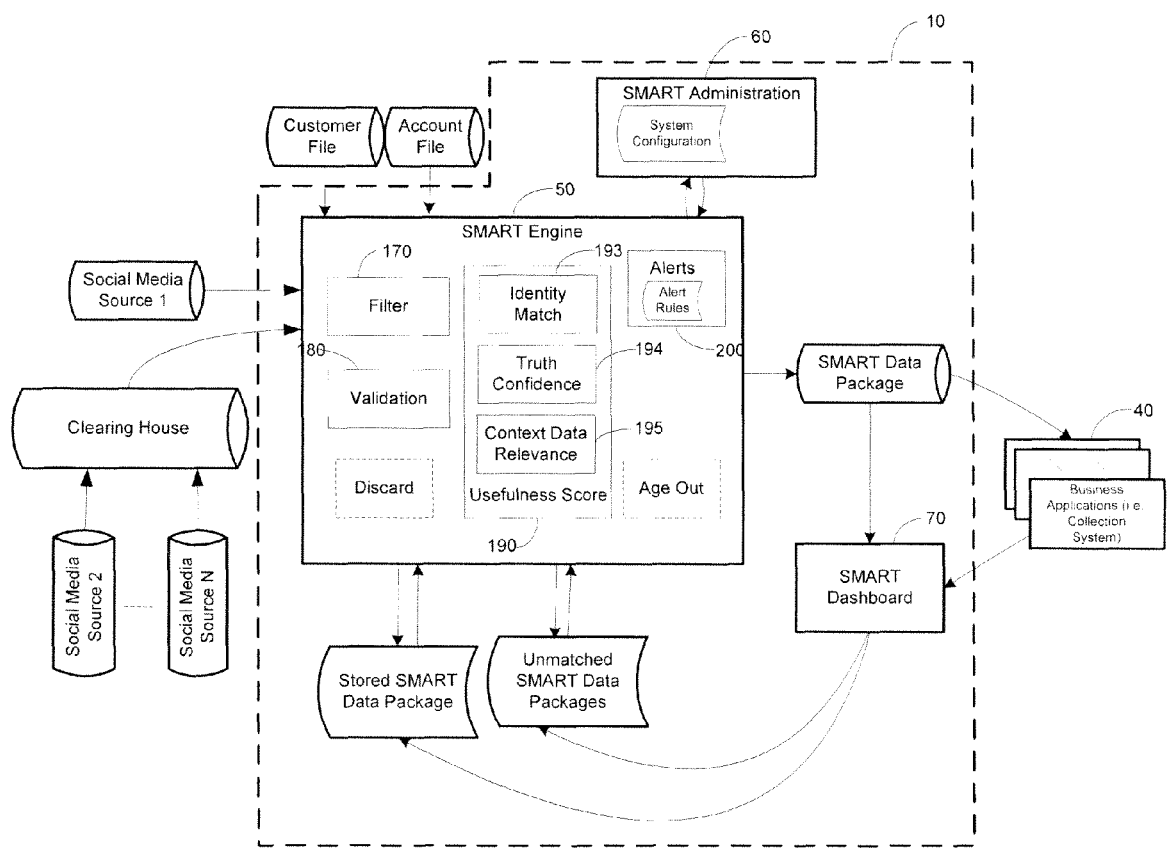
FIG. 3B is another exemplary conceptual block diagram illustrating interactions between the exemplary SMART engine and other components or processes.

The administrative console 60 shown in FIG. 1 is configured to manage various aspects of the SMART system 10 and SMART engine 50. In the example, the administrative console 60 sets certain configuration or operational parameters for components of the SMART engine 50 including a filtering component, a validation component, a usefulness score component, and an alert component, which are shown in FIGS. 3A and 3B.

FIG. 1 also illustrates a plurality of social media 30 over a network 20 and one or more business applications 40. The plurality of social media 30 includes various social media sources, such as LinkedIn, Facebook, Google+, Twitter, etc. Generally, a social media source can be defined as any interactive platform via which people and communities create and share user-generated content over Internet. The social media sources take on various forms such as Internet forums, weblogs, social blogs, social networks, etc. that are available over the network 20. The network 20 is one or more networks interconnecting with each other for various communications and includes private and public networks (including Internet). The one or more business applications 40 includes various business applications, including debt collection, recovery, loss mitigation, repossession, fraud evaluation, skip tracing, foreclosure, property management, or the like.

Figure 2:
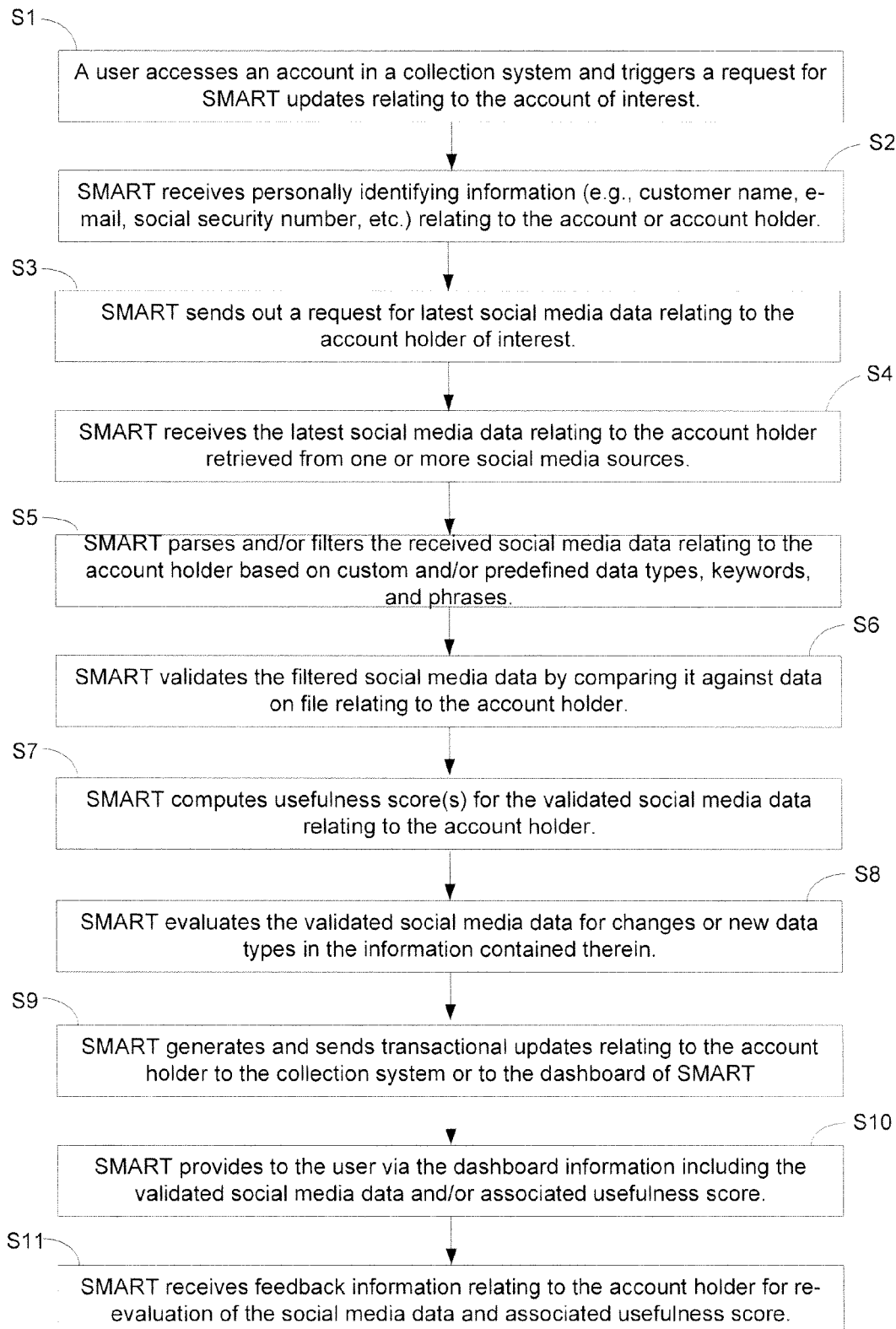
FIG. 2 is an exemplary, simplified flow chart illustrating the disclosed techniques relating to the SMART processing shown in FIG. 1.

FIG. 2 is an exemplary, simplified flow chart illustrating the disclosed techniques relating to the SMART processing shown in FIG. 1. At S1, a user or collection specialist 5 operating one of the business applications 40 (i.e., a debt collection system), as shown in FIG. 1, accesses an account of interest and requests for social media data updates ("SMART updates") relating to the account holder. At S2, before initiating the SMART updates, the SMART system 10 receives certain information about the account holder of interest. The certain information may include personally identifying information of the account holder, such as customer name, email, phone number, social security number, etc. At S3, based on the personally identifying information, the SMART system 10 sends out a request to one or more social media sources for social media data relating to the account holder, and, responsive to the request, at S4, the SMART system 10 receives the latest social media data relating to the account holder from the one or more social media sources. Alternatively, the SMART system 10 may send out a request and responsive to the request receive the latest social media data relating to the account holder from a social media monitoring or aggregation system (i.e., a clearinghouse), which collects various social media information relating to the account holder from the one or more social media sources and make them available for fees. Such social media monitoring system can be configured to monitor various social media services or sources, such as Twitter, Facebook, news comments and blogs, etc. and further can be services directly provided by the social media sources.

At S5, the received social media data relating to the account holder is filtered and parsed based on custom and/or pre-defined data types, keywords, and phrases. For example, after analyzing sentences or phrases of the social media data in terms of grammatical constituents and identifying the parts of speech, syntactic relations, etc., a filter (or the keyword or phrase "employment history") can be used to filter out and group a plurality of received social media data retrieved from the one or more social media sources. Further, exemplary data types include employment information (i.e., employer, location, role, etc.), marital status, bankruptcy data, probate information (i.e., deceased customers and estate information), asset data (i.e., major expenditures or asset locations), commercial data (i.e., company structures, company status, new contracts, etc.), location (i.e., information on the current or historical location of the customer), time information (i.e., any raw information or patterns abut the time the customer is in a specific location, posting information active on certain demographic channels), associates information (i.e., any information about other persons, companies, organizations or entities with whom the customer interacts), interests (i.e., any information about the customer's interest in general topics, products, markets, etc.), and other details. The other details can include any other information about the customer; for example, if the customer is a Smartphone user, that can be known or inferred from various social media sources.

The social media data is parsed into individual data packages and categorized by type of data types. Logistical information about the social media data is collected, such as date of posting, person posting information, or source of posting. Also, depending on the data package type, there may be additional information stored in the data package (which is configurable within the SMART system) that can be collected about the social media data. For example, a data package type ("Location Data Package") can include logistical information and various additional information. An exemplary Location Data Package includes:

Date of Posting;
Person Posting Information;
Source of Posting;
Length of Posting;
Formality of Posting (whether slangs, abbreviations used, offensive language, etc.);
Date of Location;
Person(s) at the location;
Latitude/Longitude Coordinates of location;
Duration at Location;
Tagged Name of Location;
Known business, organizations or other entities at location; and
Last time at location.

Another Exemplary Employment Data Package Includes:
Date of Posting;
Person Posting Information;
Source of Posting;
Related Location Information Data Package;
Company Name;
Company ID on Social Media Source;
Start Date;
End Date;
Is Current (Yes/No);
Job Title;
Job Description;
Named Colleagues;
Known Recommendation Data Packages; and
Known Endorsement Data Packages.

At S6, the filtered social media data is validated by the SMART system 10 (or SMART engine 50) by comparing the filtered social media data against data on file in connection with the account holder of interest. The validation of the retrieved social media data can include identity matching of the social media data, which is described in detail below. In the exemplary embodiment, the identity matching is part of the SMART processing, but it can be done by third party software and services outside the SMART processing such as InfoGlide software. The third party identity matching software such as InfoGlide performs identity matches and determines non-obvious relationships between individuals. At S6 the received social media data is compared with the existing social media data stored for the account holder. The social media data that matches in all characteristics to previously processed and stored social media data is discarded as duplicate. For example, the filtered social media data based on the employment history is compared against current and previous employment history data on file relating to the account holder. Alternatively, the validation of the retrieved social media data can be done based on other criteria including user defined criteria. Further, the validation of the retrieved social media data can also be based on input entered by a user (or a collection specialist 5 in FIG. 1), which is collected while talking with the account holder over a telephone.

At S7, after validating the filtered social media data, the SMART engine 50 computes a usefulness score for each piece of validated data retrieved from the one or more social media sources. As noted earlier, the usefulness score ("Usefulness Score") or social media usefulness score ("SMUS") is defined herein as a symbolic representation including numerical values representing a level of usefulness of a piece of information contained in social media data retrieved from one or more social media sources, as it relates to a business application for a specific account. Typically, a usefulness score for a piece of social media data is represented as a numerical value. It is also noted that a usefulness score in the form of non-numerical values can be used instead. A higher value of the usefulness score associated with social media data means a higher level of certainty regarding the usefulness of the information contained therein. In the example, a Usefulness score is computed as a numerical value in a predefined range of values based on various formulas, which are described in detail below. Further, social media data (i.e., a data package) retrieved from a social media source can be used for multiple business applications. That is, for the social media retrieved from the social media source, the usefulness score can be different for different business applications (i.e., different formulas or equations for usefulness score are used for different business applications).

After computing the usefulness score for the validated social media data, as shown at S8, the SMART engine 50 evaluates the validated social media data for any changes or new data types in the information contained therein. That is, the SMART engine 50 determines whether or not there is any updated information in the validated social media data relating to stored social media data for the account holder. For example, for an employment data type, the SMART engine 50 would evaluate the validated social media data whether or not it contains any information relating to a job change by comparing the newly retrieved, filtered, validated, scored social media data against existing stored social media data related to employment data type and reconcile the employment social media data.

If the SMART engine 50 detects any change in employment such as a recent job change, then transactional updates are generated and sent to the debt collection system (i.e., of the business applications 40), at S9. The change in employment can be sent to the presentation layer or dashboard 70 of the SMART system 10 for presentation to the user 75. Also, the scored social media data package is scored within the SMART engine 50.

At S10, after computing the usefulness score for the validated social media data, the SMART engine 50 can provide information including the validated social media data and/or its associated usefulness score to the dashboard 70 of the SMART system 10 for presentation via a graphical user interface on the terminal device to the user 75. The user 75 then reviews the validated social media data and/or its computed usefulness score for further consideration and action.

Further, as described earlier, certain feedback information can be supplied by the user 5 or 75 to the SMART system 10 for re-evaluation of the social media data retrieved from the social media sources. As shown at S11, when the user 5 or 75 determines that certain retrieved social media data is not reliable, or inaccurate or in need of discarding, the information can be inputted by the user 5 or 75 via the graphical user interface into the SMART system 10 for reevaluation of the usefulness score for the social media data and subsequent adjustments.

Having discussed various aspects of process flows involved in the SMART system 10, at a very high level, further implementation details are provided below. Although in this disclosure, the SMART engine 50 is described as being implemented in software, it is well understood by one skilled in the art that the SMART engine 50 or SMART system 10 can be easily implemented in hardware or combinations of both software and hardware.

FIG. 3A is a conceptual software architecture of the exemplary SMART engine 50. FIG. 3B is another conceptual block diagram illustrating interactions between the exemplary SMART engine and other components or processes.

Referring to FIG. 3A, at a high level, the SMART engine 50 comprises a plurality of software layers or components. The SMART engine 50 manages various communications with social media sources (including definitions of services to access and identify data to send to the social media sources) and end-user configuration. As shown in FIG. 3A, the SMART engine 50 includes a presentation component 110, an application component 120, and a data component 130. The term "a component" or "component" is used herein to mean an identifiable part of a larger program, which provides a particular function or group of related functions. A system is divided into components that in turn are made up of modules. The term "a module" or "module" is used herein to mean a separate, smaller unit of software or hardware.

The presentation component 110 is an end-user interface to the SMART engine 50. The presentation component 110 can take on different forms such as the dashboard 70 or a graphical user interface to be displayed on a client device. The presentation component 110 provides summary level information for each social media data including data types, indicator flags for data on file, data changes, new data, and presents results of usefulness score calculations and allows the end-users to drill down from the various data categories into the individual posts that triggered a flag or update. Further, in the example, the presentation component 110 comprises a configuration module 150 and a user access module 160. The configuration module 150 sets operational parameters for various modules (i.e., the user access module 160, a filter module 170, a validation module 180, a usefulness score module 190, an alert module 200, etc.). The user access module 160 controls and manages communication with various business applications 40. The presentation component 110 can operate as a standalone application for representation of results (i.e., via a graphical user interface), or alternatively it can be used in concert with one or more business applications 40.

Figure 3C:
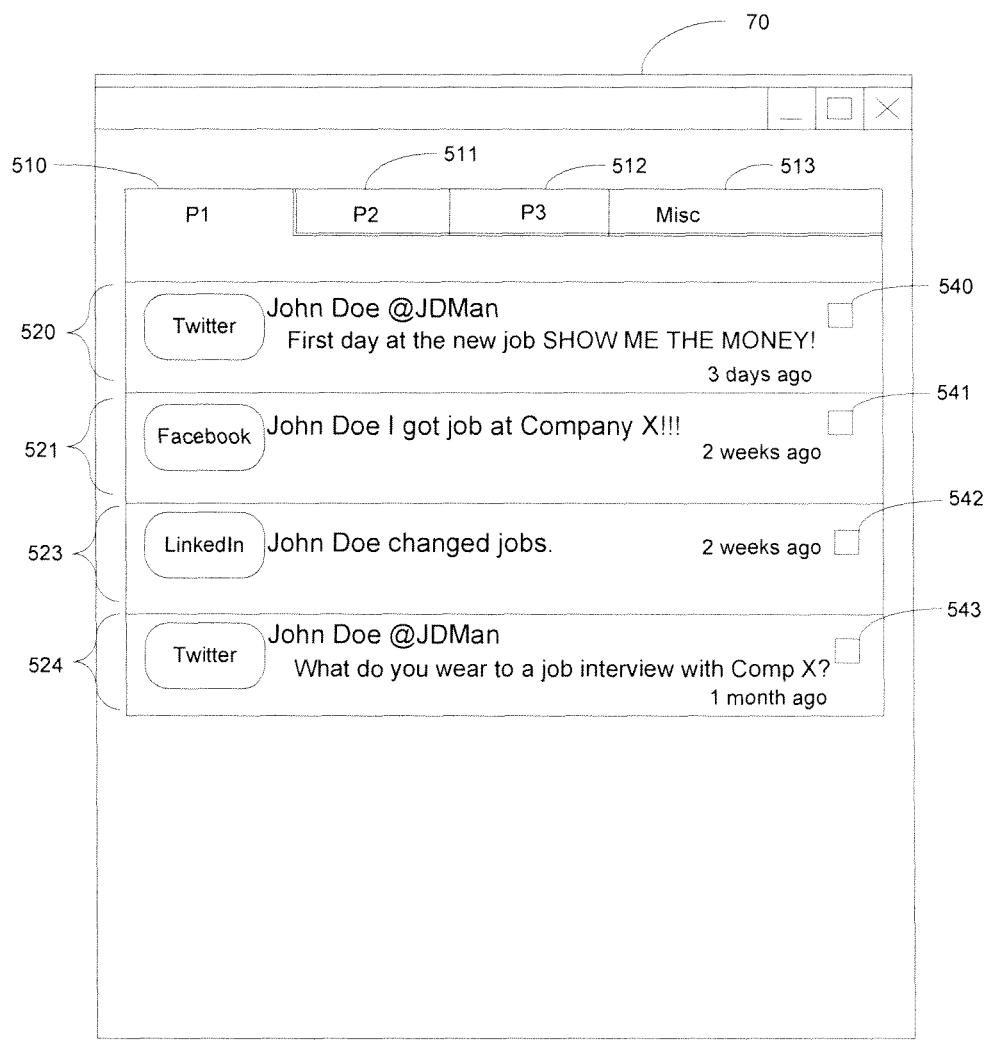
FIG. 3C illustrates an exemplary dashboard of an exemplary SMART system.

An exemplary dashboard 70 of the presentation component 110 is illustrated in FIG. 3C. As shown in FIG. 3C, the exemplary dashboard 70 comprises one or more tabbed displays 510, 511, 512, and 513. The tabbed displays are displayed by priority (i.e., P1, P2, P3, and Misc.) based on the usefulness score of the social media data or social media data package. The miscellaneous display 513 displays information found in lower priority categories of data, as well as relevant information to assist with conversation starters (i.e., interests, likes, etc.) by the user 75 or collection specialist 5 with the customer (or account holder). As illustrated in FIG. 3C, the relevant social media data pulled from various social media network sites will be displayed as seen on their profiles on the social network site (or social media source) in the appropriate order based on the computed usefulness score. For example, four pieces of information relating to employment for an account holder, John Doe, are retrieved from social media sources, Twitter, Facebook, and LinkedIn, and are displayed on the highest priority tab display 510, as shown at 520, 521, 523, and 524. Also, for each social media data, information relating to the age of the piece of social media data is displayed (or how long the information has been posted at the respective social networking site).

The exemplary dashboard 70 also includes a plurality of buttons 540, 541, 542, and 543, each button corresponding to each social media data retrieved from a social networking site. The buttons 540, 541, 542, and 543 provide the user with means for providing feedback information to the SMART engine 50 on each social media data displayed for re-evaluation purposes. For example, as noted earlier, the user or collection specialist may find out additional information from the account holder, while talking with the account holder of interest, that certain information displayed on the dashboard 70 is not accurate or true (i.e., whether the social media data is a valid piece of data, whether the social media data is related to the account holder at all), and feedback can be provided to the SMART engine on that piece of social media data so that future calculation of the usefulness score, identity matching or other processing by the SMART engine can be adjusted. Upon obtaining such additional information from the account holder, the collection specialist may select corresponding button(s). When the corresponding button(s) are selected, the user will be presented with another input screen (i.e., text input, selections, or etc.) so that the user can enter the additional information into the SMART engine 50 for re-evaluation of the social media data displayed on the dashboard 70 and its computed usefulness score. Some exemplary feedback on the social media data from the user, which can be entered, include reason codes, such as (1) "not a correct match" (the information presented does not correspond to the account holder or person to which it is associated, (2) "not truthful information" (the information presented is correctly matched to the account holder but the information itself is not correct), (3) "more useful than scored" (user found the information was more useful than SMART system suggested, (4) "less useful than scored" (user found the information was less useful than SMART system suggested, and (5) "offensive" (the information is inappropriate for system use).

Additionally, the user may discover that the social media data relating to the account holder is invalid and mark it accordingly on the dashboard 70 so that the SMART engine 50 reevaluates the social media data and recalculates the associated usefulness score. Further, the user may discover that the social media data relating to the account holder contains offensive material and mark it accordingly on the dashboard 70 so that the SMART engine 50 receives the input and places the social media data for manual review in the future.

Further, in another implementation, the exemplary dashboard 70 may include an override button (not shown). Specifically, the SMART engine 50 computes a usefulness score for a piece of social media data. Based on the usefulness score, the social media data is presented on the dashboard 70 or the like for a user in order of usefulness score value for the account holder. In talking with the account holder, the user may discover that certain social media data is not valid for the account holder. In such a case, the user can use the override button on the dashboard 70 to affect or override the usefulness score of the social media data. Also, based on the user input relating to the social media data, table entries (i.e., Context Data Relevance, Identity Match Value, Truth Confidence Value tables, or the like) used in computing usefulness scores for social media data can be automatically modified. For example, if it is determined that social media data from a social media source ABC has been determined unreliable, then the table entry values for the social media source ABC in the Truth Confidence Value table will be automatically changed to a lower value.

Referring to FIG. 3A, the application component 120 of the SMART engine 50 comprises a filter module 170, a validation module 180, a usefulness score module 190, and an alerts module 200. Also, although not shown in FIG. 3A (but shown in FIG. 3B), the application component 120 of the SMART engine 50 may include discard and age out modules. The discard module stores and processes inaccurate or unrelated social media data retrieved from the social media sources. If the validation results in an unsuccessful outcome, the validation module 180 stores the result for later analysis and reporting by passing the result to the discard module. The age out module monitors ages of retrieved social media data and triggers automatic requests for social media data updates or automatic archiving.

As shown in FIGS. 3A and 3B, the filter module 170 performs various filtering operations based on user-configurable and/or predefined criteria for retrieved social media data, which is contained in the data component 130. The filter module 170 categorizes the received social media data into different data types or categories of data. As noted above, the filter module 170 is configured to allow users to configure the data types and key indicators to filter for in retrieved social media data. In the example, the categories of data may include location data, employment data, demographic data, user-defined data, or the like.

Also, as noted, the filter module 170 performs other processing functions for the social media data, such as grouping of certain information contained in the retrieved social media data based on different categories of data. In the example, the retrieved social media data can be parsed or broken into unique data elements ("data package") and categorized into different types of data or information ("categories of data or data package types"). Here, the term "categories of data" and "data package types" are interchangeable. The exemplary categories of data include demographic information (i.e., addresses, telephone numbers, e-mail addresses, twitter accounts, etc.), employment information (i.e., employer, location, role, position, etc.), marital status (i.e., single, married, divorced, etc.), bankruptcy data, probate information (i.e., deceased customers, estate information), asset data (i.e., major expenditures or asset locations), commercial data (i.e. company structures, company status, new contracts, etc.), location (i.e., information on the current or historical location of the customer), time (i.e., any raw information or patterns about the time the customer is in a specific location, posting information, active on certain demographic channels, including geotagging of images, checkins, exposed network routing, etc.), associates (i.e., any information about other persons, companies, organizations or entities which whom the customer interacts with), interests (i.e., any information about the customer's interest in general topics, products or markets, etc.), or other details (i.e., any other information about the customer, for example, whether or not she is a Smartphone user), etc. The categories of data can be extensible with user-defined categories of data. Further, the categories of data can be defined with different levels of sensitivity that allows grouping by a viewer. i.e., raw viewable, graphic, manager only, not for credit, or the like.

The filtering module 170 further collects logistical information related to the social media data, such as when the social media was posted, the source of the posting, who posted the information, whether there were any abbreviations or slangs, whether there were any non-alphabetical symbols, whether there were offensive words used, etc. This logistical information could be used later in the derivation of a usefulness score of the social media data. The table below describes exemplary logistical information included in such a data package (i.e., location data package and employment data package).

TABLE 1

Exemplary Location Data Package and Employment Data Package

| Logistical Information | Information related to Data Package Type | Feedback from SMART | Processing Information | Used in Scoring |
|---|---|---|---|---|
| *Exemplary Location Data Package* | | | | |
| Date of Posting | Location Data | Reason codes | Last Score | Identity Match Value |
| Date of Location | Package type | Date/User when Reason Code entered | Date of Last Score | Truth Confidence Value |
| Person Posting Information | Person(s) at the location | Override Date/User when Override entered | Archived Version of Data Package | Context Data Relevance Value |
| Relationship to Account | LAT/Long Coordinates of location | | Identity Matching used Identifier | Usefulness Score |
| Associates listed on Posting | Duration at Location Tagged Name of Location | | Alert sent | Date of Score |
| Source of Posting | Known business, organizations or other entities at location | | | |
| Type of Posting | Last time at location | | | |
| Length of Posting | | | | |
| Formality of Posting (whether slangs, abbreviations used, offensive language, etc.) | | | | |
| Data sensitivity | | | | |
| *Exemplary Employment Data Package* | | | | |
| Date of Posting | Employment Data Package Type | Reason code Override | Last Score | Identity Match Value |
| Date of Location | Company Name | | Date of Last Score | Truth Confidence Value |
| Person Posting Information | Company ID on Social Media Source | | Archived Version of Data Package | Context Data Relevance Value |
| Relationship to Account | Start Date | | Identity Matching used Identifier | Usefulness Score |
| Associates listed on Posting | End Date | | Alert sent | Date of Score |
| Source of Posting | Is Current (Yes/No) | | | |
| Type of Posting | Job Title | | | |
| Length of Posting | Job Description | | | |
| Formality of Posting (whether slangs, abbreviations used, offensive language, etc.) | Named Colleagues Known Recommendation Data Packages Known Endorsement Data Packages | | | |
| Data sensitivity | Related Location Information Data Package | | | |

The validation module 180 of the SMART engine 50 validates and provides confirmation of information contained in the retrieved social media data against data currently on file when the social media data is retrieved from the social media sources or clearing house. The validation module 180 also provides confirmation notices to the business applications 40 and presentation component 110 (and to the dashboard 70) that the social media data was validated against the social media services. In the example, social media data validation is performed against all relevant categories of data including user-configured and predefined categories. The predefined categories of data may include demographic data, employment data, marital status data, asset data, corporate operating status data, bankruptcy data, probate data, and the like. That is, the validation module 180 validates the filtered social media data by comparing the filtered social media data against data on file. If the validation results in a successful outcome, the validation module 180 sends the validated social media data to the usefulness score module 190 for computing a usefulness score for the validated social media data. If the validation results in an unsuccessful outcome, the validation module 180 stores the result for later analysis and reporting by passing the result to the discard module.

The usefulness score module 190 of the SMART engine 50 evaluates the validated social media data from various social networking sites by computing a usefulness score for the validated social media data based on the identity match factors, truthfulness factor and context data relevance factor. These factors include a source, context of the information received, the number of demographics, personally identifying data elements that could be verified, age of the information, etc. As described below, the usefulness score module 190 can compute a usefulness score for the validated social media data based on pre-defined rules or policies, and associate the computed usefulness score with the validated social media data, for presentation to the user of the SMART system 10 or one or more business applications 40. The usefulness score represents the value of that social media to the business application factored or discounted by the identity matching of that social media data, the truthfulness of that social media data and the relevance of that social media data to the business application at a specific point in time based on when the score is calculated. Social media data is time-based and the usefulness score reflects this through the calculation of the score.

In one implementation, for a data package (or social media data) a usefulness score for the data package can be computed as follows:

$$\text{Usefulness Score} = [\text{Identity Match Value} \times \text{Truth Confidence Value} \times \text{Context Data Relevance Value}] / \text{Scale Factor},$$

where Scale Factor can be set to limit the value of usefulness score.

As shown above in the example, computing Usefulness Score for social media data requires at least three values—Identity Match Value, Truth Confidence Value and Context Data Relevance Value.

Identity Match Value is defined as a value determined based on different identity matches, which indicates the reliability or certainty that the social media data matches with the account holder or selected individuals. A unique identifiable identifier ("handle") for each social media data source is matched against the account holder (or account) records on file. An identifier or "handle" is a unique combination of attributes which is uniquely identifies an individual (or account holder) to the social media sourced. In one implementation, a value of 0 to 100 is assigned as Identity Match Value, if an online presence matches a customer record.

For example, as shown in Table 2 Exemplary Identity Match Value below, if both customer name and e-mail are used for matching, then a value of 50 is assigned as Identity Match Value; if customer name and phone number are used for matching, then a value of 40 is assigned as Identity Match Value; and if customer name is used for matching, then a value of 20 is assigned as Identity Match Value.

TABLE 2

Exemplary Identity Match Value

|  | Identity Match Value |
|---|---|
| Customer Name and Email Matches | 50 |
| Customer Name and Phone Number Matches | 40 |
| Customer Name Match | 20 |

There are various software and services available to evaluate identity matching such as InfoGlide software which helps find matches of individuals taking into account various factors such data input errors, linguistics and purposeful data misrepresentations. In evaluating the Identity Match Value for the retrieved social media data, any data records under a configurable threshold may not be matched to customer records, and an out of bounds process can be in place to evaluate if previously matched Handle is no longer a match. Further, table entries for Identity Match Value can be modified based on statistical analysis of collected social media data over time.

Truth Confidence Value is defined as a value determined based on a source for social media source and/or attributes related to the social media data, which represents the certainty or reliability of the social media data being accurate or truthful at point in time. The Truth Confidence Value can be evaluated based on a number of factors including source of the social media data. For example, as shown in Table 3 Exemplary Truth Confidence Value, if the employment data is retrieved from LinkedIn, a value of 50 is assigned as the Truth Confidence Value; if the employment data is retrieved from Twitter, a value of 30 is assigned as the Truth Confidence Value; and if the employment data is retrieved from Facebook, a value 20 is assigned as the Truth Confidence Value, and so forth.

TABLE 3

Exemplary Truth Confidence Value

|  | Truth Confidence Value |
|---|---|
| Data Source A - LinkedIn | 50 |
| Data Source B - Twitter | 30 |
| Data Source C - Facebook | 20 |

For Truth Confidence Value, each data source is assigned a truth confidence value based on category of data, data source provider, format of data, consistency with other data package, other attributes, or any combination thereof. Alternatively, the truth confidence values can be automatically modified based on a statistical analysis of collected social media data over time.

Alternatively, in other implementations, Truth Confidence Value can be calculated based on many factors including the source of information, how the information was made available, who posted the information, how the information was presented, or the like. In one implementation, a general process for computing Truth Confidence Value can be defined as follows: (1) determine the data package type of retrieved social media data, (2) resolve the Truth Confidence table for that data package type (i.e., employment, marital status, etc.), (3) lookup the value in the Truth Confidence Value table corresponding to the source of the information and the way the information was posted, (4) select and apply a Truth Confidence Value based on the author group of the person posting the information, (5) select and apply an information format discount factor, (6) return the Truth Confidence Value as Truth Confidence value=Current Employment×Author Group Discount Factor×Information Format Discount Factor.

Below are some exemplary Truth Confidence tables including other attributes that can be used in the other implementations for computing Truth Confidence Value.

TABLE 4A

Exemplary Truth Confidence Table for Current Employment

| Current Employment | Status Update | Listed Employer |
|---|---|---|
| Facebook | 30 | 50 |
| LinkedIn | 50 | 100 |
| Google+ | 10 | 40 |
| Named Source 1 | 10 | 40 |
| Named Source N | 10 | 40 |
| All Others | 10 | 20 |
| Author Group Discount Factor (in Percent) | | |
| Self | 100 | 100 |
| Other Account Holder | 80 | 80 |
| Known Associate on Source | 70 | 70 |
| Author Group N | 10 | 10 |
| All Other/Unknown | 10 | 10 |

TABLE 4B

Exemplary Truth Confidence Table for Relationship Status

| Relationship Status | Status Update | Listed Relationship |
|---|---|---|
| Facebook | 70 | 100 |
| LinkedIn | 10 | 20 |
| Google+ | 50 | 90 |
| Named Source 1 | 50 | 90 |
| Named Source N | 50 | 90 |

TABLE 4B-continued

Exemplary Truth Confidence Table for Relationship Status

| Relationship Status | Status Update | Listed Relationship |
|---|---|---|
| All Others | 30 | 20 |
| *Author Group Discount Factor (in Percent)* | | |
| Self | 100 | 100 |
| Other Account Holder | 80 | 80 |
| Known Associate on Source | 70 | 70 |
| Author Group N | 10 | 10 |
| All Other/Unknown | 10 | 10 |

TABLE 4C

Exemplary Truth Confidence Table for Location Information

| Location Information | Checkin | Photo Tagging | Status Update |
|---|---|---|---|
| Facebook | 100 | 70 | 80 |
| LinkedIn | 70 | 20 | 20 |
| Google+ | 50 | 90 | 90 |
| Named Source 1 | 50 | 90 | 90 |
| Named Source N | 50 | 90 | 90 |
| All Others | 30 | 50 | 50 |
| *Author Group Discount Factor (in Percent)* | | | |
| Self | 100 | 100 | 100 |
| Other Account Holder | 80 | 80 | 80 |
| Known Associate on Source | 70 | 70 | 70 |
| Author Group N | 10 | 10 | 10 |
| All Other/Unknown | 10 | 10 | 10 |

TABLE 4D

Exemplary Information Format Discount Factor

| | Information Format Discount Factor (in Percent) | | | |
|---|---|---|---|---|
| | No format errors | Each misspelled word | Improper grammar | Each Known slang |
| Current Employment | 100 | 80 | 70 | 99 |
| Relationship Status | 100 | 99 | 99 | 90 |
| Location Information | 100 | 50 | 50 | 50 |
| Data Package 1 | 100 | 50 | 50 | 50 |
| Data Package n | 100 | 30 | 30 | 30 |

Using Tables 4A-4D above, a Truth Confidence Value can be computed as follows. First, assume that social media data retrieved from social media sources including LinkedIn and Facebook contains information relating to a recent job change by John Doe. Further, it is assumed that at LinkedIn John Doe updated his LinkedIn profile to list current employer as "ACME Tools" and used proper spelling and grammar for the posting, and others left comments about the job change at Facebook. Then the Truth Confidence value for the first posting at LinkedIn is calculated as follows:

Truth Confidence Value (for social media data from LinkedIn)=Current Employment (LinkedIn, Listed Employer)×Author Group Discount Factor (Self)×Information Format Discount Factor (No Errors)=100×100%×100%=100.

It is assumed that, as a second posting, a friend of John Doe posts a comment about his job change at Facebook as follows: "Hey John Doe, congrats on to new job @ Acme Tools." The Truth Confidence Value for the second posting is calculated as follows:

Truth Confidence Value (for social media data from Facebook)=Current Employment (Facebook, Status)×Author Group Discount Factor (Known Associate on Source)×Information Format Discount Factor (2 known slangs, 1 misspelled word)=30×70%×(99%×99%×80%)=18.1.

As noted earlier, a usefulness score for a piece of social media data can be computed as: Usefulness Score=[Identity Match Value×Truth Confidence Value×Context Data Relevance Value]/Scale Factor, where Scale Factor can be set to limit the value of usefulness score. Context Data Relevance Value is defined herein as a numerical value in a range of zero and hundred, which represents levels of certainty of information contained in social media data of a specific category (i.e., employment, geographic location, marital status, relationship status, etc.) over a predefined time span (1 day, 3 days, 1 week, 1 month, 6 months, etc.). As an illustrative example, as shown in Table 5A and 5B below, for Northern Virginia Car Loan (one of account groupings), if employment data, such as job change information is less than 1 day old (current), then the Context Data Relevance Value will be assigned a value of 100; if the employment data is less than 3 days old, then the Context Data Relevance Value will be assigned a value of 80; if geographic location information is less than 1 week, than the Context Data Relevance Value will be assigned a value of 30; if geographic location is less than 1 month, the Context Data Relevance Value will be assigned a value of 20, and so forth.

TABLE 5A

Exemplary General Scheme for Context Data Relevance Value

| Strategic Group | Less than 1 day | Less than 3 days (but greater than 1 day) | Less than 1 week (but greater than 3 days) | Less than 1 month (but greater than 1 week) | Less than 6 months (but greater than 1 month) | * (greater than 6 months) |
|---|---|---|---|---|---|---|
| Category 1 | 100 | 80 | 70 | 30 | 10 | 1 |
| Category 2 | 30 | 30 | 30 | 20 | 20 | 10 |
| Category 3 | 5 | 5 | 5 | 5 | 5 | 5 |

TABLE 5B

Exemplary Context Data Relevance Value for Northern Virginia Car Loan

| Northern Virginia Car Loan | Less than 1 day | Less than 3 days (but greater than 1 day) | Less than 1 week (but greater than 3 days) | Less than 1 month (but greater than 1 week) | Less than 6 months (but greater than 1 month) | * (greater than 6 months) |
|---|---|---|---|---|---|---|
| Employment | 100 | 80 | 70 | 30 | 10 | 1 |
| Geographic location | 30 | 30 | 30 | 20 | 20 | 10 |
| Marital Status | 5 | 5 | 5 | 5 | 5 | 5 |

It is also noted that Context Data Relevance Value can be set with different entry values or predefined for other types of accounts (or different groupings of customers). For example, collection accounts can be grouped into (i) Customer of Risk Score <3, (ii) Auto Loans in Georgia, (iii) Mortgages with program in force (e.g., 3-months payment hiatus due to loss of employment, or the like. In each case, as shown in Table 5C-5E below, for calculating Usefulness Score for social media data relating to an account holder, a different Context Data Relevance Value table can be predefined for use.

As an illustration of selecting a different Context Data Relevance table, if the account of interest is one of auto loans in Georgia (that is, it belongs to Auto Loans in Georgia group), then the SMART engine 50 will select Table 5D Exemplary Context Data Relevance Value for computing Context Data Relevance values; and for each category of data (i.e., employment, geographic location, marital status or the like) a corresponding value under the indicated time span (less than 1 day, less than 1 week, less than 1 month, less than 6 months, less than 1 year, or older) is selected as a Context

TABLE 5C

Exemplary Context Data Relevance for Customer of Risk Score < 3

| Type of Data | Less than 1 day | Less than 3 days (but greater than 1 day) | Less than 1 week (but greater than 3 days) | Less than 1 month (but greater than 1 week) | Less than 6 months (but greater than 1 month) | * (older or greater than 6 months) |
|---|---|---|---|---|---|---|
| Employment | 75 | 50 | 30 | 30 | 30 | 30 |
| Geographic Location | 50 | 25 | 1 | 1 | 1 | 1 |
| Marital Status | 75 | 75 | 75 | 50 | 50 | 50 |

TABLE 5D

Exemplary Context Data Relevance for Auto Loans in Georgia

| Type of Data | Less than 1 day | Less than 3 days (but greater than 1 day) | Less than 1 week (but greater than 3 days) | Less than 1 month (but greater than 1 week) | Less than 6 months (but greater than 1 month) | * (older or greater than 6 months) |
|---|---|---|---|---|---|---|
| Employment | 5 | 5 | 5 | 5 | 5 | 5 |
| Geographic Location | 100 | 100 | 95 | 50 | 25 | 10 |
| Marital Status | 30 | 30 | 30 | 30 | 30 | 30 |

TABLE 5E

Exemplary Context Data Relevance for Mortgages with Program in Force (e.g., 3-months payment hiatus due to loss of employment)

| Type of Data | Less than 1 day | Less than 3 days (but greater than 1 day) | Less than 1 week (but greater than 3 days) | Less than 1 month (but greater than 1 week) | Less than 6 months (but greater than 1 month) | * (older or greater than 6 months) |
|---|---|---|---|---|---|---|
| Employment | 100 | 100 | 100 | 5 | 5 | 5 |
| Geographic Location | 30 | 30 | 30 | 30 | 30 | 30 |
| Marital Status | 30 | 50 | 50 | 50 | 50 | 50 |

Data Relevance value for that social media data for computing Usefulness score. That is, if the account is one of the auto loans in Georgia, then Table 5D is selected for use. Then, based on the data type of the social media data and time span, a job change information relating to the account holder which is less than one week old will have a value of "5" for Context Data Relevance value for the employment data type, which will be used in computing the usefulness score associated with the social media data relating to the job change information.

It is also noted that although all the table values are predefined, the SMART engine 50 may modify table entries based on its statistical data analysis over time via a self learning process. Although the self learning process can be implemented through multiple algorithms the following algorithm is provided as an example way to implement. During the normal use of the system the users can provide feedback on the actual identity match, truthfulness and usefulness of the information. This feedback can be used and processed to perform the self learning process. In an example a social media data was presented to the user but the user marked that social media data as not very useful. In this example it had a Social Media score of 79 out of a possible 100. The collection of all social media data presented for that account holder had 10 records in total with a range of values from 1 to 85, a median of 45, a mode of 38 and a standard deviation of 14. The information for the account holder is requested again and the system scores the same 10 social media data. In this subsequent processing the social media data that was marked as not very useful is initially processed to a value of 77 and the ten (10) records in total now have a range from 1 to 83, a median of 44, a mode of 37, and a standard deviation of 15. The system then adjusts the calculated score from 77 to a score that is the greater of 1 and two standard deviations from the social media data set, or a score of 14. Alternatively, the table values can be periodically modified as part of configuration parameters set by the administrative console or device.

Once the Identity Match Value, Truth Confidence and Context Data Relevance Value have been derived for a social media data package, the Usefulness Score can be computed using the formula:

Usefulness Score=[Identity Match Value×Truth Confidence Value×Context Data Relevance Value]/ Scale Factor, where Scale Factor can be set to limit the value of usefulness score.

As an another illustrative example for computing a usefulness score for a piece of information retrieved from a social media source, let's assume that employment status data (a recent job change) regarding John Doe is retrieved from three different social media sources, for example, LinkedIn, Twitter, and Facebook. Also, let's assume that the customer name and personal email account information are used to retrieve the employment status data and that John Doe posted his job change information 4 days ago. Based on these factors and Tables 1-5, usefulness scores for the retrieved employment data can be computed as follows (for each social media source):

Social Media Data $A$=John Doe applied a Status Update on LinkedIn revealing new employer ACME, posted 5 days ago;

Social Media Data $B$=John Doe updated the Employer field within Google+ about a new job at ACME posted 10 days ago;

Social Media Data $C$=John Doe Employer data on Facebook, posted 2 days ago

For on the Identity Match processing for the social media data, the identifier information sent for Social Media Data A was name, phone number and received an Identity Match Value of 50. The Social Media Data B had identifier information as email address and name and received Identity Match Value of 40. The Social Media Data C had identifier information as screen name and email address and received Identity Match Value of 20.

For the calculation of the Truth Confidence value, Social Media data A will receive a value of 50 based on the social media message being a status update on LinkedIn as in Table 6A. Social Media data B will receive a Truth Confidence value of 40 and Social Media Data C will receive a Truth Confidence value of 50 based on Table 6A.

TABLE 6A

Exemplary Truth Confidence Table for Current Employment

| Current Employment | Status Update | Listed Employer |
|---|---|---|
| Facebook | 30 | 50 |
| LinkedIn | 50 | 100 |
| Google+ | 10 | 40 |
| Named Source 1 | 10 | 40 |
| Named Source N | 10 | 40 |
| All Others | 10 | 20 |
| Author Group Discount Factor (in Percent) | | |
| Self | 100 | 100 |
| Other Account Holder | 80 | 80 |
| Known Associate on Source | 70 | 70 |
| Author Group N | 10 | 10 |
| All Other/Unknown | 10 | 10 |

Next, the Context Data Relevance value is computed based on the how the social media data will be used within the business application. In this example, John Doe has an outstanding auto loan debt which is in Northern Virginia. The table 6B will be selected based on the criteria from the account holder and the social media data information. For Social Media Data A which is 5 days old, the Context Data Relevance value will be 70. For Social Media Data B which is 10 days old, the Context Data Relevance value will be 30. For Social Media Data C which is 2 days old, the Context Data Relevance value will be 80.

TABLE 6B

Exemplary Context Data Relevance Value for Northern Virginia Car Loan

| Northern Virginia Car Loan | Less than 1 day | Less than 3 days (but greater than 1 day) | Less than 1 week (but greater than 3 days) | Less than 1 month (but greater than 1 week) | Less than 6 months (but greater than 1 month) | * (greater than 6 months) |
|---|---|---|---|---|---|---|
| Employment | 100 | 80 | 70 | 30 | 10 | 1 |
| Geographic location | 30 | 30 | 30 | 20 | 20 | 10 |
| Marital Status | 5 | 5 | 5 | 5 | 5 | 5 |

The Usefulness Score of the different social media data will be computed based on the Context Data Relevance value, the Identity Match value, and the Truth Confidence value of each data package. For example, Usefulness Score of Social Media Data A (LinkedIn)= [Context Data Relevance Value (70)×Identity Match Value (50)×Truth Confidence Value (50)]/ Scale Factor (1000)=175.

Usefulness Score of Social Media Data B (Google+)= [Context Data Relevance Value (30)×Identity Match Value (40)×Truth Confidence Value (40)]/ Scale Factor (1000)=48.

Usefulness Score of Social Media Data C (Facebook) =[Context Data Relevance Value (80)×Identity Match Value (20)×Truth Confidence Value (50)]/ Scale Factor (1000)=80.

Although a few exemplary techniques for computing Context Data Relevance Value, Identity Match Value, and Truth Confidence Value based on exemplary tables are presented herein, other techniques including non-table entry based methods are possible. It is also noted that one skilled in the art would understand that different techniques for computing usefulness scores for social media data, based on other formula based or statistics based techniques can be employed in place of table based techniques.

Referring to FIGS. 3A and 3B, the SMART engine 50 includes the alerts module 200. The alerts module 200 notifies the users or business applications of any changes in information retrieved from the social media sources. That is, in the example, when a change (i.e., job changes, moves, new big purchases, bonuses, etc.) is detected in the social media data retrieved from the one or more social media sources relating the account holder of interest, the alerts module 200 generates an alert message and sends to the one or more business applications 40 and/or to the dashboard 70 of the SMART system 10. One or more alert message are generated when user-configured and/or predefined data changes or new data categories are detected by the alerts module 200. In one implementation, the predefined data changes may include demographic information, employment status, marital status, asset data, corporate operating status, bankruptcy data, probate information, etc. Also, when changes or new data categories are detected, the alert module 200 can post updates to the presentation component 110 for presentation via the dashboard 70 and/or trigger transactional updates to external business applications 40.

In addition to data changes, the alerts module 200 is configured to pass all raw and filtered data, as well as provide summary indicators for each of the configured data types. More specifically, the alerts module 200 can provide summary information of the social media data including the number of matches, number of posts reviewed, number of posts filtered, number of matches by key word and data type, usefulness score, or the like. Also, the alerts module 200 can be configured to send flags for each of the data types indicating if the social media data has been received, changed, or is new for that data type. Thus, through these functionalities, the alerts module 200 enables the business application(s) 40 to display summary level data and allows end-users to drill down to supporting detail.

As shown in FIG. 3A, the data component 130 of the SMART engine 50 is responsible along with other components for receiving social media data retrieved from the one or more social media sources, and storing the received social media data for other components for processing. In the example, the data component 130 may also include one or more files containing data relating to one or more account holders for validation purposes.

Having discussed various components of the SMART system 10, another exemplary process is described below for better understanding of the disclosed techniques and methodologies.

Figure 4:
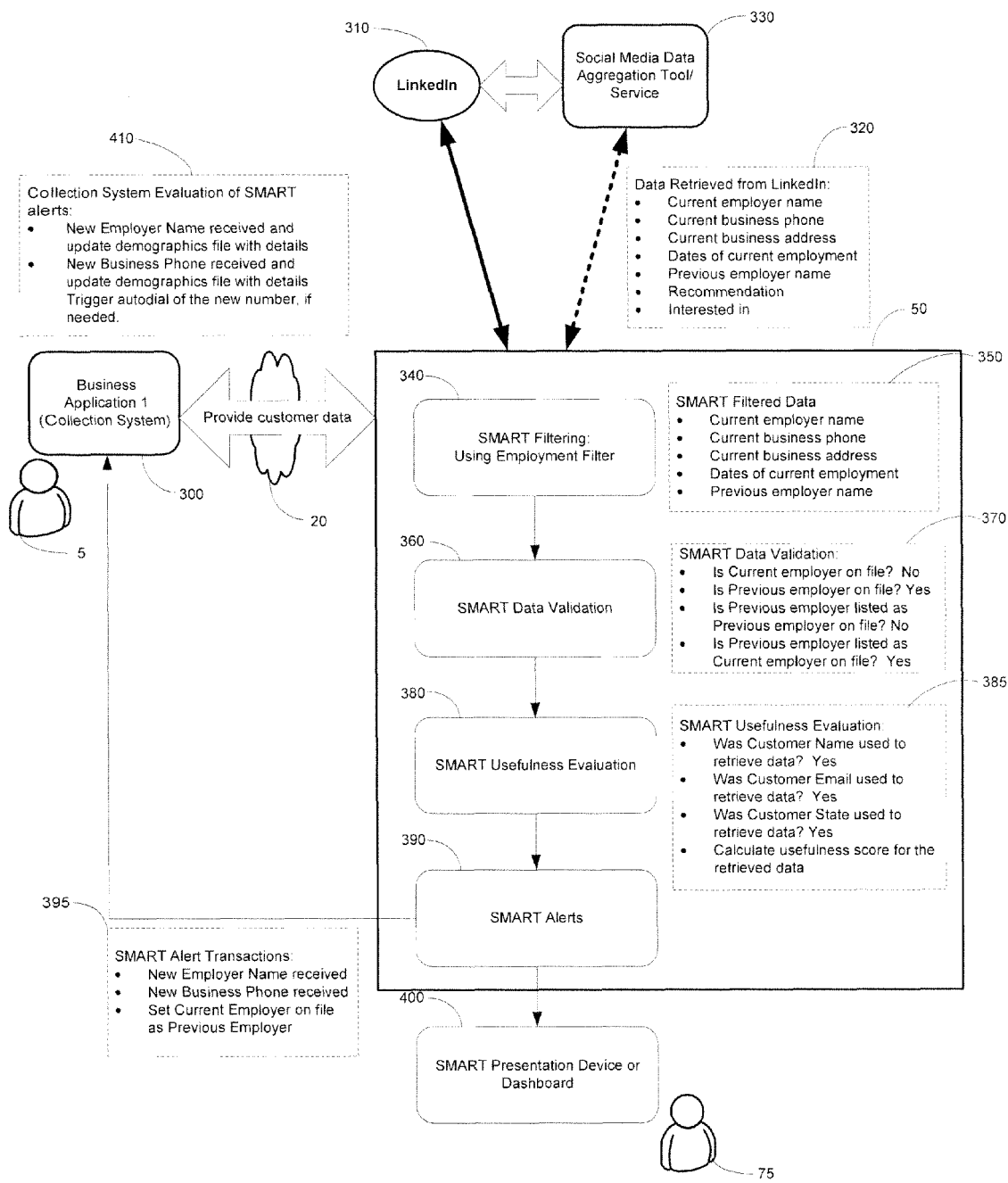
FIG. 4 is a simple process diagram illustrating an exemplary SMART processing using an employment filter.

FIG. 4 provides another simplified exemplary process of the SMART processing using an employment filter, for illustration purposes. For example, let us assume that a user of the SMART system or mortgage collection specialist wishes to find out current employment status of an account holder ("customer") who is delinquent in mortgage payment. The user requests for updated employment information relating to the customer via a mortgage collection system 300. The mortgage collection system 300 sends a request to the SMART system 10 (to SMART engine 50) over the network 20 for the updated employment information relating to the customer by providing personally identifying information on the customer, such as customer name, e-mail, telephone number, etc. Upon receipt of the request and personally identifying information from the mortgage collection system 300, the SMART engine 50 contacts a social media source (i.e., LinkedIn) 310 and retrieves social media data 320 relating to the customer, such as current employer name, business phone, business address, dates of current employment, previous employer name, recommendation, interested in, etc. Alternatively, the SMART engine 50 retrieves the social media data 320 from one or more of the commercially available aggregation service or clearing house 330.

Upon receiving the social media data, the SMART engine 50 filters the received social media data 320 using an employment filter. After filtering, at 340, the social media data 350 left with information containing only current employer name, business phone, business address, dates of current employment, and previous employer name. For illustration purposes, it is assumed that the current employer name was updated 2 days ago. The filtered social media data 350 is then validated at 360 by the validation module 180. That is, as shown at 370, the employment filtered data is validated by comparing the filtered social media data against stored data on file and determining answers to a series of exemplary employment validation questions. The exemplary employment validation questions and hypothetical answers, based on the filtered social media data, are: (i) is current employer on file? No, (ii) is previous employer on file? Yes, (iii) is previous employer listed as previous employer on file? No, and (iv) is previous employer listed as current employer on file? Yes.

After validating the filtered social media data, as shown at 380 and 385, a usefulness score is calculated based on the disclosed techniques herein, including exemplary techniques based on predefined tables of values. Also, in the example, it is assumed that a usefulness score for the social media data is calculated using the following formula:

Usefulness Score=Context Data Relevance Value× Identity Match Value×Truth Confidence Value/ Scale Factor (1000).

In the example, it is noted that data category is employment and time band is 2 days (which is less than 3 days). Thus, using Tables 2, 3, and 5 above, the Context Data Relevance Value is set to 80 (assuming the employment data is less than 3 days old). Identity Match Value is set to 50 (assuming the name and email matches), and Truth Confidence Value is set to 50 (i.e., the data source is LinkedIn). Thus, a usefulness score for the retrieved social media data relating to the employment data can be computed as 80*50*50=200.

Further, it can be configured in such a way that, if the usefulness score is above a certain threshold value (to be set by system parameters or user-configurable parameters) for the employment data, as shown at 390, an alert message including alert transaction details is generated to the user of the SMART system 10 (at 400) and/or the mortgage collection system 300 for an automatic update of a change in the employment status of the customer. In the example, the alert message, as shown at 395, includes information, such as the new employer name, new business phone number, and parameters for setting the current employer on file as previous employer. Upon receipt of the updated employment information relating to the customer, the mortgage collection specialist can be notified or the mortgage collection system 300 can inform the collection specialist of the updated employment data relating to the customer. Alternatively, the mortgage collection system 300 can be configured to automatically call the new business phone number, or to automatically update scripting for a call by a customer service representative for collection calls. Further, as shown at 410, the mortgage collection system 300 can evaluate the alert message from the SMART engine 50 and updates its data relating to the customer, and takes further action necessary assisting the collection specialist. For example, based on the alert message, the collection specialist can call the customer and engage in a conversation about the change with the customer informing different options available to the customer, thereby increasing the customer satisfaction.

Furthermore, it is noted that in the example, the collection specialist can be the same individual accessing the SMART engine 50 via the SMART presentation device or dashboard 70 via a graphical user interface running on the collection system 300 operating as a client terminal (and the SMART engine 50 acting as a server), although they are shown in FIG. 4 as separate users of different systems—the collection system 300 and SMART engine 50.

As shown by the above discussion, functions relating to SMART processing of social media data for enhanced business application may be implemented on computers connected for data communication via the components of a packet data network, operating as a server and/or as a SMART engine as shown in FIG. 1. Although special purpose devices may be used, such devices also may be implemented using one or more hardware platforms intended to represent a general class of data processing device commonly used to run "server" programming so as to implement the disclosed techniques relating to the SMART system discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the SMART engine including various components or modules (a filter module, validation module, a usefulness score module, an alert module, a presentation module, etc.). The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for the disclosed techniques relating to the SMART system, in essentially the manner performed in the implementations discussed and illustrated herein.

Figure 5:
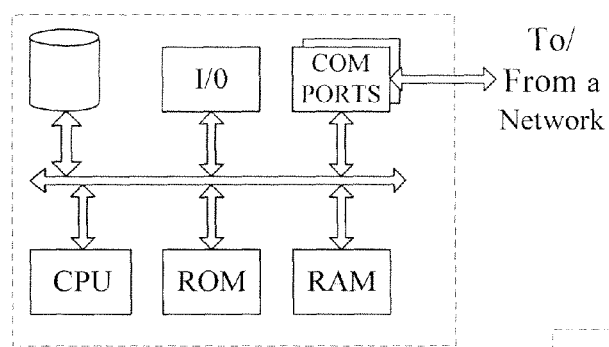
FIG. 5 is a simplified functional block diagram of a computer that may be configured as a host or server, for example, to function as an exemplary SMART engine as shown in FIG. 1.
Figure 6:
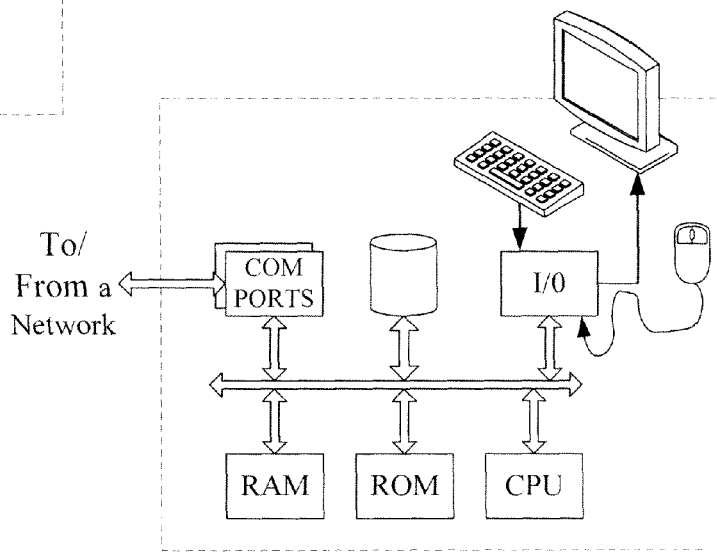
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the disclosed techniques relating to the SMART system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the SMART system into one or more computer platforms that will operate as components of the SMART system in a remote distributed computing environment. Alternatively, the host computer of the SMART system can download and install the presentation component or functionality (including a graphical user interface) into a wireless computing device which is configured to communicate with the SMART engine on a network. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer(s) or the like, such as may be used to implement the techniques in this disclosure. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

Many of the above described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software operations can be implemented as sub-parts of a larger program while remaining distinct software operations. In some implementations, multiple software operations can also be implemented as separate programs. Finally, any combination of separate programs that together implement a software invention described herein is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted language, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed herein is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The embodiments described hereinabove are further intended to explain and enable others skilled in the art to utilize the invention in such, or other, embodiments and with the various modifications required by the particular applications or uses of the invention. Accordingly, the description is not intended to limit the invention to the form disclosed herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow are approximate, not exact. They are intended to have a reasonable range that is consistent with the functions to which they relate and with what is customary in the art to which they pertain.

The scope of protection is limited solely by the claims that now follow. The scope is intended and should be interpreted to be as broad as consistent with the ordinary meaning of the language that is used in the claims when interpreted in light of this specification and the prosecution history that follows and to encompass all structural and functions equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any acua such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not without further constraints, preclude the existence of additional identical elements in the process, method, article, or apparatus that comprises the element.

The Abstract of the Disclosure is provided to allow the reader to quickly ascertain the nature of the technical disclosure. It is submitted that the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more feature than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method to be implemented in one or more processors, the method comprising steps of:
   receiving, from a business application in a business enterprise system storing data for a plurality of account holders, identifying information of an account holder and financial account information associated with the account holder;
   generating, in the business enterprise system, a request for information regarding the account holder, the information to be retrieved over a network from one or more social media sources, and the request including the identifying information of the account holder;
   responsive to the request, receiving social media data relating to the account holder and retrieved over the network from at least one of: the one or more social media sources or a clearing house;
   processing the received social media data;
   computing a usefulness score for the processed social media data according to the particular business application from which the identifying information was received and according to the particular financial account associated with the account holder for which information was received, and associating the usefulness score with the processed social media data;
   determining whether the computed usefulness score for the processed social media data is above a threshold value; and
   upon determining that the usefulness score for the processed social media data is above the threshold value, performing at least one of:
      communicating the processed social media data to a business application to trigger an update to the business application,
      communicating the processed social media data to a business application to trigger an update of demographic information of the account holder,
      communicating the processed social media data to a business application to automatically configure a phone call to the account holder or party associated with the processed social media data, and
      communicating the processed social media data to a business application to automatically update call scripts used by a customer service agent when communicating with a person associated with the financial account,
   wherein the computing of the usefulness score comprises:
      selecting, based on the particular business application from which the identifying information was received and on the financial account associated with the account holder for which information was received, a method for computing the usefulness score from among a plurality of methods for computing the usefulness score; and
      computing the usefulness score based on the selected method for computing the usefulness score, wherein the usefulness score comprises an identity match value and a context data relevance value for the processed social media data, the identity match value indicating a level of certainty that the processed social media data relates to the account holder associated with the received identifying information, and the context data relevance value indicating a relevance of the processed social media data based on a time span that is associated with a category of information contained in the processed social media data and based on the particular business application from which the identifying information was received and on the financial account associated with the account holder for which information was received.

2. The method of claim 1, wherein the step of processing the received social media data comprises:
   filtering the received social media data using one or more filters; and
   validating the filtered social media data by comparing the filtered social media data against stored data relating to the account holder.

3. The method of claim 2, further comprising:
   determining whether the validated social media data includes a change in information relating to the account holder; and
   when it is determined that the validated social media data includes a change in the information relating to the account holder, generating an alert message based on the change in the information relating to the account holder.

4. The method of claim 2, wherein the one or more filters include at least one of:
   a data type, a category of data, a keyword, or a phrase.

5. The method of claim 3, wherein the alert message comprises at least one of:
   the validated social media data or the usefulness score associated with the validated social media data.

6. The method of claim 3, wherein the step of generating an alert message comprises generating an alert message based in part on at least one of: user-defined data change information or pre-defined data change information.

7. The method of claim 1, wherein the identifying information includes at least one of: name, e-mail, or phone number of the account holder.

8. The method of claim 1, wherein the step of computing a usefulness score comprises computing a usefulness score based in part on a source of the social media data or context of the social media data.

9. The method of claim 1, wherein the step of receiving identifying information of the account holder comprises receiving the identifying information via a file, wherein the file contains a list of identifying data of one or more account holders, the identifying data comprising at least one of: names, e-mails, or phone numbers of the one or more account holders.

10. The method of claim 1, wherein the step of computing a usefulness score for the processed social media data comprises calculating a usefulness score based at least in part on the identity match value, the context data relevance value, and a truth confidence value.

11. The method of claim 2, further comprising:
receiving input relating to the social media data, the input obtained from the account holder;
determining whether the validated social media data is accurate; and
computing a second usefulness score for the validated social media data based on the received input.

12. The method of claim 10, wherein the usefulness score is calculated based on table entry values of one or more tables for the context data relevance value, the identity match value, and the truth confidence value.

13. The method of claim 12, wherein the table entry values of the one or more tables are automatically modified over time.

14. A system for using social media data in connection with one or more business applications, wherein the system is implemented in a non-transitory computer readable storage medium storing programming for execution on one or more processors, the system comprising:
a presentation component configured to present information relating to the social media data for a particular account holder to a user of the system or to the one or more business applications; and
an application component comprising:
a filtering module configured to receive the social media data relating to the particular account holder retrieved from one or more social media sources over a network, and to apply one or more filters to the received social media data relating to the particular account holder;
a validation module configured to validate the filtered social media data against stored data for the particular account holder including financial account information associated with the account holder and stored in the one or more business applications in a business enterprise system;
a usefulness score module configured to compute a usefulness score for the validated social media data; and
an alert module configured to determine whether the computed usefulness score for the validated social media data is above a threshold value and, upon determining that the usefulness score for the validated social media data is above the threshold value, cause the system to perform at least one of:
communicate the validated social media data to a business application to trigger an update to the business application,
communicate the validated social media data to a business application to trigger an update of demographic information of the account holder,
communicate the validated social media data to a business application to automatically configure a phone call to the account holder or party associated with the validated social media data, and
communicate the validated social media data to a business application to automatically update call scripts used by a customer service agent when communicating with a person associated with the financial account,
wherein the usefulness score module is further configured to compute an identity match value and a context data relevance value for the processed social media data, the identity match value indicating a level of certainty that the processed social media data relates to the account holder associated with the received identifying information, and the context data relevance value indicating a relevance of the processed social media data based on a time span associated with a category of information contained in the processed social media data, and
wherein the presentation component is further configured to display to the user of the system the usefulness score associated with the validated social media data for the particular account holder.

15. The system of claim 14, wherein the system is configured to receive from the one or more business applications a request for social media data relating to the account holder, the request including identifying information comprising at least one of: name, e-mail, or phone number of the account holder.

16. The system of claim 14, wherein the presentation component is configured to present to the user of the system, via a graphical user interface, the validated social media data and its usefulness score associated with the validated social media data.

17. The system of claim 14, wherein the application component further comprises an alert module configured to evaluate the validated social media data and to generate an alert message upon detecting a change in information contained in the validate social media data relating to the account holder.

18. The system of claim 14, wherein the one or more filters include at least one of: a data type, a category of data, a keyword, or a phrase.

19. The system of claim 14, wherein the usefulness score for the social media data is calculated based at least in part on the identity match value, the context data relevance value, and a truth confidence value.

20. An article of manufacture, comprising a non-transitory computer readable storage medium and programming embodied in the medium, wherein execution of the programming by a processor of a computer implements functions to:
receive, from a business application in a business enterprise system storing data for a plurality of account holders, identifying information of an account holder and financial account information associated with the account holder;
generate, in the business enterprise system, a request for information regarding the account holder, wherein the information is retrieved over a network from one or more social media sources, and the request includes the identifying information of the account holder;
responsive to the request, receive social media data relating to the account holder and retrieved over the network from at least one of: the one or more social media sources or a clearing house;
process the received social media data; and
compute a usefulness score for the processed social media data according to the particular business application from which the identifying information was received and according to the particular financial account associated with the account holder for which information was received;
determine whether the computed usefulness score for the processed social media data is above a threshold value; and
upon determining that the usefulness score for the processed social media data is above the threshold value, perform at least one of:
communicate the processed social media data to a business application to trigger an update to the business application, communicate the processed social media data to a business application to trigger an update of demographic information of the account holder, communicate the processed social media data to a business application to automatically configure a phone call to the account holder or party associated with the processed social media data, and communicate the processed social media data to a business application to automatically update call scripts used by a customer service agent when communicating with a person associated with the financial account, wherein the function to compute the usefulness score comprises:

a function to select, based on the particular business application from which the identifying information was received and on the financial account associated with the account holder for which information was received, a method for computing the usefulness score from among a plurality of methods for computing the usefulness score; and a function to compute the usefulness score based on the selected method for computing the usefulness score, wherein the usefulness score comprises an identity match value and a context data relevance value for the processed social media data, the identity match value indicating a level of certainty that the processed social media data relates to the account holder associated with the received identifying information, and the context data relevance value indicating a relevance of the processed social media data based on a time span that is associated with a category of information contained in the processed social media data and based on the particular business application from which the identifying information was received and on the financial account associated with the account holder for which information was received.

21. The method of claim 1, wherein the computing of the identity match value is based at least in part on two or more identifiers associated with the account holder being matched in the processed social media data, wherein the identifiers associated with the account holder include one or more of an account holder name, an account holder handle, an account holder email address, and an account holder phone number.

22. The system of claim 14, wherein the usefulness score module computes the identity match value based at least in part on two or more identifiers associated with the account holder being matched in the processed social media data, wherein the identifiers associated with the account holder include one or more of an account holder name, an account holder handle, an account holder email address, and an account holder phone number.

23. The article of claim 20, wherein the identity match value is computed based at least in part on two or more identifiers associated with the account holder being matched in the processed social media data, wherein the identifiers associated with the account holder include one or more of an account holder name, an account holder handle, an account holder email address, and an account holder phone number.

* * * * *